(12) United States Patent
Kang et al.

(10) Patent No.: US 10,313,919 B2
(45) Date of Patent: Jun. 4, 2019

(54) METHOD AND DEVICE FOR PROVIDING TRANSMISSION DIFFERENTIATION IN MOBILE COMMUNICATION SYSTEM

(71) Applicant: Samsung Electronics Co., Ltd., Gyeonggi-do (KR)

(72) Inventors: Seongryong Kang, Gyeonggi-do (KR); Neunghyung Lee, Gyeonggi-do (KR); Jonghyune Kim, Seoul (KR); Youngki Jeon, Gyeonggi-do (KR); Jungah Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 11 days.

(21) Appl. No.: 15/539,005

(22) PCT Filed: Dec. 14, 2015

(86) PCT No.: PCT/KR2015/013664
§ 371 (c)(1),
(2) Date: Jun. 22, 2017

(87) PCT Pub. No.: WO2016/105010
PCT Pub. Date: Jun. 30, 2016

(65) Prior Publication Data
US 2018/0007580 A1    Jan. 4, 2018

(30) Foreign Application Priority Data

Dec. 22, 2014 (KR) .................. 10-2014-0186013

(51) Int. Cl.
*H04L 12/26* (2006.01)
*H04W 28/02* (2009.01)
(Continued)

(52) U.S. Cl.
CPC ..... *H04W 28/0268* (2013.01); *H04L 47/2441* (2013.01); *H04W 28/0263* (2013.01); *H04W 28/12* (2013.01); *H04W 76/10* (2018.02)

(58) Field of Classification Search
CPC .......... H04L 47/2441; H04W 28/0263; H04W 28/0268; H04W 28/12; H04W 76/10
See application file for complete search history.

(56) References Cited

U.S. PATENT DOCUMENTS

2013/0170350 A1    7/2013  Sarkar et al.
2014/0133432 A1*   5/2014  Obata ................. H04L 65/1016
                                                        370/329
(Continued)

FOREIGN PATENT DOCUMENTS

EP        2611234         7/2013
WO    WO 2013025534       2/2013
(Continued)

OTHER PUBLICATIONS

PCT/ISA/210 Search Report issued on PCT/KR2015/013664 (pp. 4).
PCT/ISA/237 Written Opinion issued on PCT/KR2015/013664 (pp. 10).

*Primary Examiner* — Minh Trang T Nguyen
(74) *Attorney, Agent, or Firm* — The Farrell Law Firm, P.C.

(57) ABSTRACT

The present invention relates to the transmission of traffic in a mobile communication system and, more particularly, to a method and device for transmitting traffic in consideration of a quality of service (QoS) characteristic of the traffic. The purpose of the present invention is to efficiently provide a QoS differentiated according to traffic in consideration of a traffic type and a content provider in a network congestion situation of the mobile communication system.

20 Claims, 12 Drawing Sheets

(51) Int. Cl.
*H04W 76/10* (2018.01)
*H04W 28/12* (2009.01)
*H04L 12/851* (2013.01)

(56) References Cited

U.S. PATENT DOCUMENTS

| | | |
|---|---|---|
| 2014/0198644 A1 | 7/2014 | Basilier et al. |
| 2014/0226641 A1 | 8/2014 | Kim |
| 2015/0009826 A1 | 1/2015 | Ma et al. |
| 2015/0049606 A1* | 2/2015 | So .................. H04L 47/808 370/230 |
| 2015/0229970 A1 | 8/2015 | Ma et al. |
| 2016/0112896 A1 | 4/2016 | Karampatsis et al. |
| 2016/0359750 A1* | 12/2016 | Miklos .................. H04L 47/24 |

FOREIGN PATENT DOCUMENTS

| | | |
|---|---|---|
| WO | WO 2013123467 | 8/2013 |
| WO | WO 2014110410 | 7/2014 |

* cited by examiner

FIG. 4

| QCI | Resource Type | Priority | QoS Characteristics PDB, PELR | Weight | Service Type | Content provider Level |
|---|---|---|---|---|---|---|
| 1 | GBR | 2 | 100ms, $10^{-2}$ | N/A | Conversational video | N/A |
| 2 | GBR | 4 | 150ms, $10^{-3}$ | N/A | Conversational video | N/A |
| 3 | GBR | 3 | 50ms, $10^{-3}$ | N/A | Real time gaming | N/A |
| 4 | GBR | 5 | 300ms, $10^{-6}$ | N/A | Non-conversational video | N/A |
| 5 | Non-GBR | 1 | 100ms, $10^{-6}$ | N/A | IMS signaling | N/A |
| 6 | Non-GBR | 6 | 300ms, $10^{-6}$ | W1 | Video (Buffered Streaming, TCP-based (e.g., www, e-mail, chat, ftp, p2p, file sharing, progressive video, ect.) | Default |
| 128 | Non-GBR | 6 | 300ms, $10^{-6}$ | W2 | Video (Buffered Streaming, TCP-based (e.g., www, e-mail, chat, ftp, p2p, file sharing, progressive video, ect.) | Premium |
| 7 | Non-GBR | 7 | 100ms, $10^{-3}$ | W1 | Voice, Video (Live Streaming), Interactive Gaming | Default |
| 129 | Non-GBR | 7 | 100ms, $10^{-3}$ | W2 | Voice, Video (Live Streaming), Interactive Gaming | Premium |
| 8 | Non-GBR | 8 | 300ms, $10^{-6}$ | W1 | Video (Buffered Streaming, TCP-based (e.g., www, e-mail, chat, ftp, p2p, file sharing, progressive video, ect.) | Default |
| 130 | Non-GBR | 8 | 300ms, $10^{-6}$ | W2 | Video (Buffered Streaming, TCP-based (e.g., www, e-mail, chat, ftp, p2p, file sharing, progressive video, ect.) | Premium |
| 9 | Non-GBR | 9 | 300ms, $10^{-6}$ | W1 | Video (Buffered Streaming, TCP-based (e.g., www, e-mail, chat, ftp, p2p, file sharing, progressive video, ect.) | Default |
| 131 | Non-GBR | 9 | 300ms, $10^{-6}$ | W2 | Video (Buffered Streaming, TCP-based (e.g., www, e-mail, chat, ftp, p2p, file sharing, progressive video, ect.) | Premium |

METHOD AND DEVICE FOR PROVIDING TRANSMISSION DIFFERENTIATION IN MOBILE COMMUNICATION SYSTEM

PRIORITY

This application is a National Phase Entry of PCT International Application No. PCT/KR2015/013664 which was filed on Dec. 14, 2015, and claims priority to Korean Patent Application No. 10-2014-0186013, which was filed on Dec. 22, 2014, the contents of each of which are incorporated herein by reference.

TECHNICAL FIELD

The present invention relates to a method and apparatus for providing transmission differentiation in a mobile communication system, and more particularly, to a method and apparatus for processing traffic of an identical Quality of Service (QoS) characteristic differently and providing better QoS to specific traffic.

BACKGROUND ART

Operators providing mobile communication Long-Term Evolution (LTE) services need to provide services of content providers requesting different Quality of Service (QoS) to subscribers that have different classes of service. To this end, operators need to: recognize the classes and types of services of subscribers; and manage and assign differentiated radio resources and network resources to user Internet Protocol (IP) traffic. Therefore, networks configure user traffic transmission channels according to Quality of Service (QoS) requirements or control traffic by services.

In recent years, with the increasing use of smart devices, such as smartphones, tablet PCs, etc., in a mobile communication network, use of Internet content such as web page access, video streaming, etc. has increased in a geometric progression. Therefore, a method is needed to effectively process data traffic which increases steeply and improve Quality of Service (QoS) and Quality of Experience (QoE) provided to users.

DISCLOSURE OF INVENTION

Technical Problem

The present invention was invented to address the above problems and disadvantages, and provide differentiated QoS by traffic, with high efficiency, in a network congestion state of a mobile communication system, considering a content provider and a type of traffic (traffic type).

Solution to Problem

In accordance with an aspect of the present invention, a traffic transmission method of a service accelerator in a mobile communication system is provided. The traffic transmission method includes: receiving traffic from at least one or more content providers; classifying the received traffic into at least one or more groups, based on information regarding content providers, included in stored traffic characteristic-related information, and transmitting the classification information to a Packet Data Network Gateway (P-GW); determining whether a bearer corresponding to Quality of Service Class Identifier (QCI) information of the classified traffic groups exists; and transmitting, if a bearer corresponding to QCI information of the classified traffic groups does not exist, a signal for establishing a bearer corresponding to QCI information of the classified traffic groups to a Policy and Charging Rules Function (PCRF).

In accordance with another aspect of the present invention, a traffic transmission supporting method of a Policy and Charging Rules Function (PCRF) in a mobile communication system is provided. The traffic transmission supporting method includes: receiving, from a service accelerator, a bearer establishment signal corresponding to Quality of Service Class Identifier (QCI) information regarding a traffic group to be transmitted to a Packet Data Network Gateway (P-GW); and transmitting, to the P-GW, a bearer establishment command corresponding to QCI information regarding the traffic group, in response to the bearer establishment signal. The QCI information corresponds to a QoS characteristic of the traffic group and is previously determined based on information regarding a content provider of a traffic group.

In accordance with another aspect of the present invention, a traffic transmission method of a Packet Data Network Gateway (P-GW) in a mobile communication system is provided. The traffic transmission method includes: receiving, from a Policy and Charging Rules Function (PCRF), a bearer establishment command corresponding to Quality of Service Class Identifier (QCI) information of a traffic group to be received from a service accelerator; and establishing a bearer corresponding to the QCI information or modifying an existing bearer to correspond to the received QCI information, in response to the bearer establishment command. The QCI information corresponds to a QoS characteristic of the traffic group and is previously determined based on information regarding a content provider of a traffic group.

In accordance with another aspect of the present invention, a traffic transmission method of a base station in a mobile communication system is provided. The traffic transmission method includes: receiving, from a Packet Data Network Gateway (P-GW), a traffic group transmitted via at least one or more bearers; and allocating wireless resources, based on information regarding weights included in Quality of Service (QoS) characteristics corresponding to the at least one or more bearers.

In accordance with another aspect of the present invention, a service accelerator for performing the transmission of traffic in a mobile communication system is provided. The service accelerator includes: an interface unit for transmitting/receiving traffic or information to/from another network device; and a controller for: receiving traffic from at least one or more content providers; classifying the received traffic into at least one or more groups, based on information regarding content providers, included in stored traffic characteristic-related information, and transmitting the classification information to a Packet Data Network Gateway (P-GW); determining whether a bearer corresponding to Quality of Service Class Identifier (QCI) information of the classified traffic groups exists; and transmitting, if a bearer corresponding to QCI information of the classified traffic groups does not exist, a signal for establishing a bearer corresponding to QCI information of the classified traffic groups to a Policy and Charging Rules Function (PCRF).

In accordance with another aspect of the present invention, a Policy and Charging Rules Function (PCRF) for supporting the transmission of traffic in a mobile communication system is provided. The PCRF includes: an interface unit for transmitting/receiving information to/from another network device; and a controller for: receiving, from a service accelerator, a bearer establishment signal corresponding to Quality of Service Class Identifier (QCI) information regarding a traffic group to be transmitted to a Packet Data Network Gateway (P-GW); and transmitting, to the P-GW, a bearer establishment command corresponding to QCI information regarding the traffic group, in response to the bearer establishment signal. The QCI information corresponds to a QoS characteristic of the traffic group and is previously determined based on information regarding a content provider of a traffic group.

In accordance with another aspect of the present invention, a Packet Data Network Gateway (P-GW) for performing the transmission of traffic in a mobile communication system is provided. The P-GW includes: an interface unit for transmitting/receiving traffic or information to/from another network device; and a controller for: receiving, from a Policy and Charging Rules Function (PCRF), a bearer establishment command corresponding to Quality of Service Class Identifier (QCI) information of a traffic group to be received from a service accelerator; and establishing a bearer corresponding to the QCI information or modifying an existing bearer to correspond to the received QCI information, in response to the bearer establishment command. The QCI information corresponds to a QoS characteristic of the traffic group and is previously determined based on information regarding a content provider of a traffic group.

In accordance with another aspect of the present invention, a base station for performing the transmission of traffic in a mobile communication system is provided. The base station includes: an interface unit for transmitting/receiving traffic or information to/from another network device; and a controller for: receiving, from a Packet Data Network Gateway (P-GW), a traffic group transmitted via at least one or more bearers; and allocating wireless resources, based on information regarding weights included in Quality of Service (QoS) characteristics corresponding to the at least one or more bearers.

Advantageous Effects of Invention

According to embodiments of the present invention, an apparatus in a mobile communication system is capable of providing differentiated QoS to traffic of a specific content provider (CP) among the traffic of identical traffic type, according to operator's policies, in a mobile communication system such as Long-Term Evolution (LTE).

Therefore, in case of traffic of an identical type, the apparatus provides differentiated QoS to traffic of the content provider (CP) only in a network congestion state, and thus performs the transmission of traffic, considering QoS and unitization of the network, in balance.

BRIEF DESCRIPTION OF DRAWINGS

FIG. 4 shows the configuration of QCI according to embodiments of the present invention.

MODE FOR THE INVENTION

Figure 1:
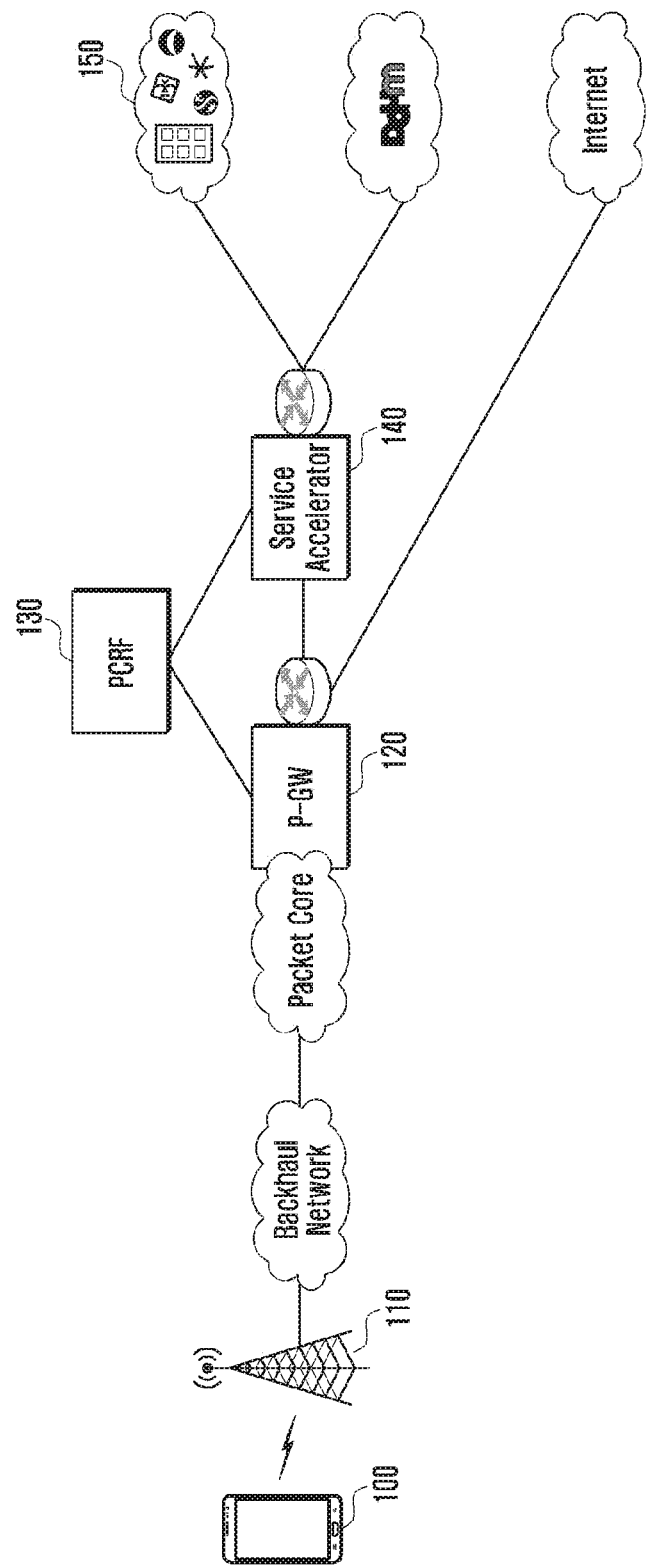
FIG. 1 is a diagram showing the configuration of a mobile communication system according to embodiments of the present invention.

In the embodiments, detailed descriptions of the technical content which is well-known and is not directly related to the embodiments of the present disclosure is omitted to avoid obscuring the subject matter of the invention, thereby highlighting the subject matter of the invention more clearly.

Similarly, the drawings are not necessarily to scale and certain features may be exaggerated, omitted, or simplified in order to better illustrate and explain the invention. The same reference numbers are used throughout the drawings to refer to the same or corresponding parts.

The features and advantages of the invention and the methods to accomplish the objectives of the invention will become more apparent from the following detailed description and the accompanying drawings. Although embodiments of the invention have been described in detail, it should be understood that many variations and modifications of the basic inventive concept herein described, which may be apparent to those skilled in the art, will still fall within the spirit and scope of the exemplary embodiments of the invention as defined in the appended claims. The same reference numbers are used throughout the drawings to refer to the same parts.

In addition, it should be understood that the blocks in the signal flowcharts and the combinations in the flowcharts can be performed via computer programming instructions. These computer programming instructions can be installed to processors of data processing equipment that can be programmed, special computers, or universal computers. The instructions, performed via the processors of data processing equipment or the computers, can create means that perform functions described in blocks of the flow charts. In order to implement functions in a particular mode, the computer programming instructions can be stored in a computer available memory or computer readable memory that can support computers or data processing equipment that can be programmed. Therefore, the instructions, stored in the computer available memory or computer readable memory, can be installed to the products, and perform the functions described in the block(s) of the flow charts. In addition, since the computer programming instructions can also be installed to computers or data processing equipment that can be programmed, they can create computer-executable processes as a series of operations are performed therein, described in the block(s) of the flow charts therein.

The blocks of the flow charts refer to part of codes, segments or modules that include one or more executable instructions to perform one or more logic functions. It should be noted that the functions described in the blocks of the flow charts may be performed in a different order from the embodiments. For example, the functions described in two adjacent blocks may be performed at the same time or in reverse order.

In the embodiments, the terminology, component '~unit,' refers to a software element or a hardware element such as an FPGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), processes, functions, attributes, procedures, sub-routines, segments of program codes, drivers, firmware, micro-codes, circuit, data, data base, data structures, tables, arrays, and variables. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

In a network environment where a relatively large amount of traffic provided by various content providers exhausts wireless network resources, operators need to provide differentiated QoS for specific traffic. Operators are capable of assigning different QoS to individual service traffic according to operator policies, and processing individual traffic in differentiation. An eNB of an LTE network performs the scheduling operation in such a way as to assign wireless resources to a bearer transmitting traffic, to correspond to QoS of the transmitted traffic, thereby implementing the differentiation by traffic.

FIG. 1 is a diagram showing the configuration of a mobile communication system according to embodiments of the present invention.

More specifically, as shown in FIG. 1, a mobile communication system is capable of including User Equipment (UE) 100, an evolved-NodeB (eNB) 110 as an access node of the UE 100, and an LTE core network (Evolved Packet Core (EPC)) including a Packet Data Network Gateway (P-GW) 120 and a Policy and Charging Rules Function (PCRF) 130. The mobile communication system is also capable of including a service accelerator 140 disposed between the EPC and an external Internet 150.

As shown in FIG. 1, the service accelerator 140 may be installed to improve user QoE and QoS of traffic provided to the UE 100. The service accelerator 140 may be installed to a wireless network to enhance the traffic transmission capability of a specific content provider (CP). The service accelerator 140 may include various traffic optimization functions, e.g., a Content Delivery Network (CDN) edge server, content caching, web and video traffic optimization, etc.

Wireless communication operators, communication equipment companies and a number of service solution vendors install network equipment, such as the service accelerator 140, to a wireless network, and use the equipment in order to reduce a delay of content delivery and a waste of bandwidth. Functions of the equipment described above may be implemented in such a way that the equipment is installed, a separate type of equipment, to a wireless network or is integrated with existing wireless network equipment.

Figure 2:
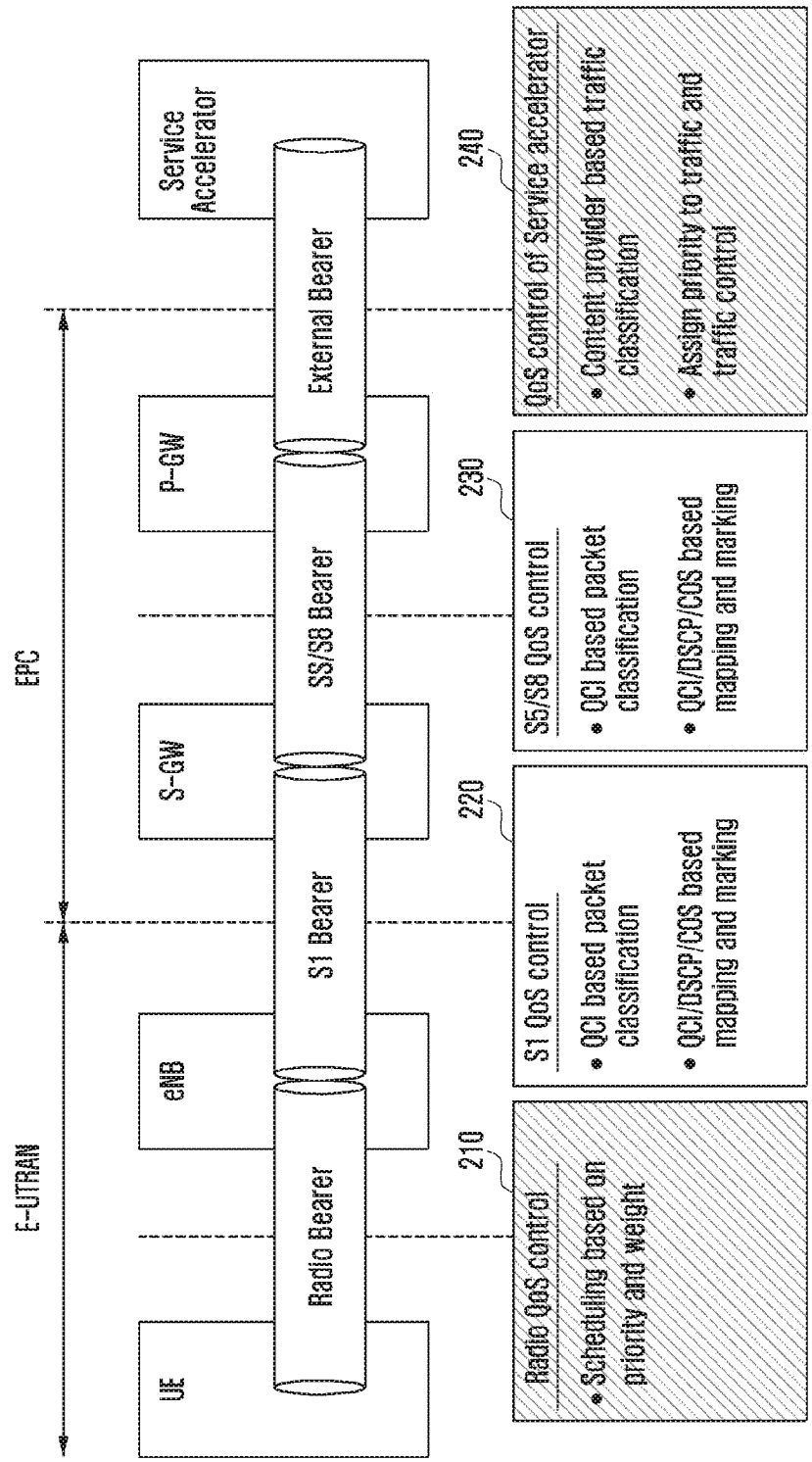
FIG. 2 is a diagram showing QoS control architecture for providing traffic differentiation service by content providers in the mobile communication system according to embodiments of the present invention.

FIG. 2 is a diagram showing QoS control architecture for providing traffic differentiation service by content providers in the mobile communication system according to embodiments of the present invention.

More specifically, a QoS control structure of the present invention is capable of associating a service accelerator 140 with a QoS framework between UE 100 and P-GW 120 in an existing LTE network, thereby additionally processing the differentiated traffic. As shown in FIG. 2, the QoS control of an LTE network described in the 3GPP standard is performed in such a way that: traffic is classified based on QoS Classification Identifier (QCI) and is transmitted to an eNB by mapping the classified traffic to bearers. The eNB is capable of performing the scheduling in such a way as to assign wireless resources to meet QoS characteristics specified by QCIs by bearers of the transmitted traffic, respectively.

In the following description, embodiments are explained based on the difference of QoS control between an existing LTE network and the present invention. The QoS control structure of the present invention is capable of performing the classification of traffic by content providers and the assignment of priority as well as the QoS process method of the standard LTE, associated with the service accelerator, in order to provide traffic differentiation by content providers (240).

In the control structure, an eNB is capable of receiving traffic which is classified according to content providers and mapped to and transmitted via a bearer. The eNB is capable of assigning wireless resources to the bearer transmitting traffic, based on a QoS characteristic corresponding to a QCI of the bearer. In this case, when a network is congested, the eNB is capable of performing the scheduling to assign wireless resources to bearers, respectively, in order to guarantee the differentiation by content providers.

The traffic classification by content providers may be distinguished, in various methods, such as a domain name, an Internet Protocol (IP) address of a content provider, etc. The service accelerator may divide the traffic into a number of content provider groups according to operator policies. The present disclosure is, for the sake of convenience, described, assuming that the traffic is divided into two groups, i.e., a premium group and a default group; and a bearer transmitting traffic that belongs to a premium group is assigned a wireless resource with a higher weight than a bearer transmitting traffic that belongs to a default group.

In the present disclosure, wireless network equipment (e.g., P-GW, Deep Packet Inspection (DPI) or Traffic Detection Function (TDF) may actually perform traffic classification via the traffic inspection.

Figure 3:
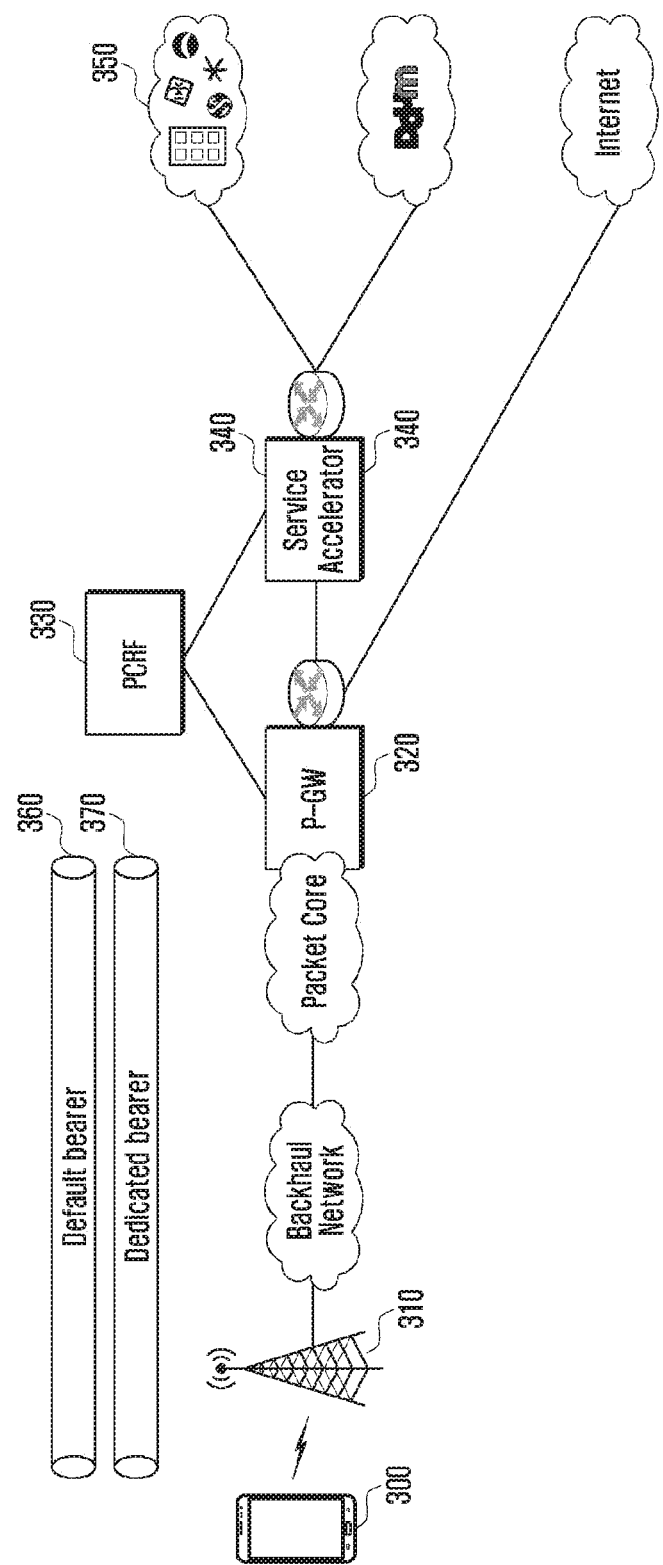
FIG. 3 is a diagram that describes a method of configuring a bearer in the mobile communication system according to embodiments of the present invention.

FIG. 3 is a diagram that describes a method of configuring a bearer in the mobile communication system according to embodiments of the present invention.

More specifically, as shown in FIG. 3, a mobile communication system is capable of including User Equipment (UE) 300, an evolved-NodeB (eNB) 310 as an access node of the UE 300, and an LTE core network (Evolved Packet Core (EPC)) including a Packet Data Network Gateway (P-GW) 320 and a Policy and Charging Rules Function (PCRF) 330. The mobile communication system is also capable of including a service accelerator 340 disposed between the EPC and an external Internet 350. A default bearer 360 and a dedicated bearer 370 may also be configured between the eNB 310 and the P-GW 320.

As shown in FIG. 3, bearers for the transmission of traffic are established between the eNB 310 and the P-GW 320. Although traffic of a content provider that belongs to a premium group is of an identical type, the present invention performs the transmission of traffic of a premium group, using a dedicated bearer, and the transmission of traffic of a default group, using a default bearer, so that it can guarantee the better process of traffic of the premium group than that of traffic of the default group.

A dedicated bearer may be established only when traffic is needed on-demand. Alternatively, a dedicated bearer may be previously established when UE is initially connected or attached to a wireless network.

Regarding a case where a dedicated bearer is established on-demand, a service accelerator generates an event for each user (UE) to the Policy and Charging Rules Function (PCRF) 330, and starts to establish a dedicated bearer, as the need arises. That is, when the service accelerator receives a content request from UE, it generates an event to the PCRF if a dedicated bearer corresponding to the UE has not been established. The PCRF generates a command for establishing a dedicated bearer to the P-GW in response to the event. After receiving a response related to the bearer establishment from the P-GW, the PCRF forwards the bearer establishment state information to the service accelerator.

The service accelerator is capable of maintaining the state information regarding dedicated bearers by UEs, cooperating with the PCRF. In this case, the service accelerator generates a bearer establishment event to the PCRF only if a dedicated bearer corresponding to a request received from UE has not been established. However, if the service accelerator does not maintain the state information regarding dedicated bearers by UEs, it generates bearer establishment commands to the P-GW each time that it receives requests from UEs.

On the other hand, when UE is attached to a wireless network, a dedicated bearer for differentiation traffic by content providers is previously established as well as a default bearer. In this case, the PCRF establishes a dedicated bearer and then provides QoS information regarding the bearer to the service accelerator.

In addition, methods are needed to map traffic of a content provider that belongs to a premium group to a dedicated bearer. One of the methods previously associates a list of all content providers in a premium group with a dedicated bearer when a dedicated bearer is established. Another method is implemented in such a way that a service accelerator generates, when receiving a content request from UE, an event to the PCRF and the PCRF generates a command to the P-GW to associate a corresponding content provider with a dedicated bearer. As described above, traffic may be transmitted from an external Internet to UE via bearer established between the eNB 310 and the P-GW 320. In this case, in order to transmit traffic to UE, requesting different QoS, according to characteristic information regarding traffic, an operator is capable of setting QoS of a bearer as a transmission channel. Therefore, the QoS is defined in a bearer level as well as a traffic level. The QoS may be determined by various parameters.

Parameters of QoS in the traffic level may be previously determined according to operator policies based on traffic characteristic-related information regarding traffic. The traffic characteristic-related information is referred to as information related to unique characteristics of traffic. In the present invention, the traffic characteristic-related information includes information regarding traffic type representing information regarding a type of service used by traffic. Examples of the traffic type information are conversational voice, conversational video, real time gaming, Voice-Long Term Evolution (Vo-LTE), video, etc.

In the embodiment, the traffic characteristic-related information may include information related to a content provider providing traffic described above. For example, the content provider-related information may include information regarding domestic portal websites, Internet financial service provider, domestic social network service provider, etc.

In the present invention, QoS characteristics of the traffic may be determined by various parameters. The parameter may include, for example, Allocation and Retention Priority (ARP), the minimum guaranteed bit rate (GBR), etc., and is configured with Quality of Service Class Identifier (QCI) corresponding to the QoS characteristics. The QCI is represented with integers 1 to 9 created by standardizing different QoS. The standardized QoS may include resource type, priority, Packet Delay Budget, Packet Error Loss Rate, etc. The ARP is a parameter representing the priority of deletion and creation in order to determine whether to create a new bearer.

The QCI configuration corresponding to a QoS characteristic in the bearer level may be previously determined according to operator policies based on traffic characteristic-related information regarding traffic. That is, an operator may previously store information regarding the QCI configuration of traffic corresponding to the traffic characteristic-related information in the service accelerator 340, PCRF 330 and P-GW 320.

A bearer transmitting traffic is associated with a pre-determined QoS Class |Identifier |$_{[ksh1]}$(QCI). Traffic transmitted via a specific bearer is scheduled by an eNB to match a QoS level defined by the QCI.

The following description provides a method of configuring QCI according to the present invention to implement a method of differentiating traffic by content providers. One method is designed in such a way as to: apply weights to QoS characteristics (priority, PDB, PELR, ARP, etc.) corresponding to QCI described above; assign, if traffic has an identical traffic type, an identical QoS characteristic to a premium |group|$_{[ksh2]}$ and a default |group|$_{[ksh3]}$; and configure QCIs which differ from each other only in QCI number and weight.

The method of differentiating traffic between a premium group and a default group differentiates the allocation of bandwidths and wireless resources to transmit data to UE, according to bearers receiving traffic from the eNB 310. Bandwidths and wireless resources are allocated, according to the weight ratio of traffic, W1 and W2, which will be described in detail later.

For traffic groups that differ from each other in weight, the traffic groups are set with different QCI information and thus distinguished from each other. The weight of traffic of the premium group may be set to be higher than that of the default group. As such, in order to perform the differentiation process, the QCI of traffic of the premium group uses an operator-specific QCI value. The operator-specific QCI value is referred to as a separate QCI value that is preset by an operator and has values of integers 128 to 131, differently from existing values of integers 0 to 9. That is, if QCI information corresponds to the operator-specific QCI, it will be appreciated that traffic transmitted via a bearer using the QCI belongs to a premium group.

If an eNB performs the allocation and scheduling of resources by bearers, using a QoS characteristic corresponding to the QCI, which will be describe later, it is advantageous that traffic can be differentially processed with the premium group and the default group only if congestion occurs in an access network. That is, a bearer transmitting the traffic of a premium group and a bearer transmitting the traffic of a default group, which are identical to each other in all the QoS characteristics except for weight, may be classified into one group according to the priority of the resource allocation among the QoS characteristics, and may be allocated wireless resources. Only if congestion occurs in an access network, resources are allocated to a bearer transmitting traffic of a premium group and a bearer transmitting traffic of a default group, considering weight, at a ratio of weight set by an operator, thereby providing a service of quality to comply with an operator policy. If wireless resources are great enough to be allocated to all the bearers since congestion does not occur in an access network, the weight-based wireless resource allocation is not employed, thereby preventing the utilization of a network from being decreased; the decrease of the utilization of a network is caused by the scheduling in consideration of weight, which is unnecessary.

In order to implement a method of differentiating traffic by content providers, another QCI configuration method according to the present invention is designed in such a way as to set (assign), although traffic is of an identical type, a QoS characteristic, which differs from that of traffic of a default group, to traffic of a premium group. That is, for traffic which needs the differentiation, resource type, priority, allowable Packet Delay Budget, and Packet Error Loss Rate, described above, are set differently. The QoS characteristic settings described above is a method that modifies an existing standard QCI table (i.e., addition of entry). In this case, although the traffic of a premium group has the same traffic type as the traffic of a default group, it has a QoS characteristic of completely different class. Therefore, although congestion does not occur in an access network, a larger amount of available wireless resources is allocated to a bearer transmitting traffic of a premium group than a bearer transmitting traffic of a default group. In addition, a bearer transmitting traffic of a premium group contends with a bearer transmitting traffic having a QCI corresponding to a QoS characteristic of a higher class about an available wireless resource, which causes to reduce QoS of traffic whose traffic type has a relatively high degree of importance, which is disadvantageous. Although sufficient wireless resources can be allocated to traffic of a premium group and traffic of a default group since congestion does not occurs, the scheduling is performed so that a relatively large amount of resources is allocated to the traffic of a premium group, and thus this decreases the utilization of a network, which is disadvantageous. Although the latter QCI configuration method and the settings of the QoS characteristic are not described in detail in the present disclosure, it would be easily appreciated to those skilled in the art how the method works.

FIG. 4 shows the configuration of QCI according to embodiments of the present invention. More specifically, FIG. 4 is a diagram showing an example of the method of adding a weight characteristic to a QoS characteristic (priority, PDB, PELR, ARP, etc.) corresponding to the QCI described above.

The following embodiment is described, assuming that two traffic QCIs are 6 and 128. The existing method determined a service (Example Service), i.e., QoS characteristics, varying depending on traffic types, and allocated QCI to meet the determined result. That is, for a Video, TCP-based service, the existing method shown in FIG. 4 allocated an identical QCI (e.g., 6) providing all identical QoS characteristics, without considering content providers.

The present invention performs the differentiation of CP levels, according to content providers providing traffic, despite an identical service (i.e., traffic type). For traffic of a content provider which needs to be preferentially processed according to a preset operator policy, i.e., traffic classified into a premium group, it is set with a weight which differs from that of traffic of a default group. Although traffic of a premium group is identical to traffic of a default group in terms of QoS level, the traffic of a premium group differs from that of the traffic of a default group in terms of weight, and thus sets QCI which differs from that of the traffic of a default group. For example, as shown in FIG. 4, in order to process differently traffic corresponding to a premium group and traffic that belongs to a default group, an operator-specific QCI value of 128 is used. In order to differentiate the allocation of bandwidths of premium and default groups, weights W1 and W2 are used.

As described above, the P-GW may performing the mapping of a bearer to transmit traffic, based on preset QCI configuration of traffic.

The bearer may be divided in type into a default bearer 360 and a dedicated bearer 370. When UE 300 is connected to an LTE core network (Evolved Packet Core (EPC)), it is allocated an IP address. With the creation of Packet Data Network (PDN) connection, a default bearer 360 is simultaneously established.

While UE is using a service via a default bearer, if the UE needs to use a service through which it cannot correctly receive a QoS of traffic via the default bearer or another dedicated bearer which is currently established, the dedicated bearer 370 is established on-demand. Alternatively, when UE is initially connected or attached to a wireless network, the dedicated bearer 370 may be previously established. In the following description, a method of establishing a bearer in an LTE core network is explained based on an on-demand condition.

In the embodiment, if traffic to be transmitted is traffic of a content provider that belongs to a premium group according to operator policies, it is mapped to and transmitted via the dedicated bearer 370. That is, despite traffic which has the same traffic type as traffic of a content provider provided by a default group, it may be mapped to and transmitted via a dedicated bearer in order to guarantee better treatment and provide differentiation.

Before a bearer for the transmission of the traffic is mapped, a process for the establishment of the bearer is needed. In particular, in order to differentiate traffic of a premium group, there are two methods of mapping to the dedicated bearer and establishing the bearer. As a first method, if a default bearer is established and a dedicated bearer is simultaneously established with a P-GW when UE described above is connected to an access network, the method previously relates a list of traffic of a premium group to the dedicated bearers. Therefore, when traffic groups perform the reception, the P-GW is capable of mapping the traffic groups to corresponding dedicated bearers, based on a list of traffic groups.

As a second method, when a bearer needs to be established since a dedicated bearer does not exist, the service accelerator generates a bearer establishment event to the PCRF, and then the PCRF generates a bearer establishment command to the P-GW. After the dedicated bearer is established, traffic of a corresponding premium group is mapped to a dedicated bearer. In the following description, the second method is explained in detail.

The service accelerator 340 receives traffic from a content provider of an external Internet and determines whether a bearer needs to be established. If a bearer needs to be established, the service accelerator 340 generates, to the PCRF 330, a bearer establishment command including QCI information indicating QoS of a traffic group, and starts to establish the dedicated bearer 370. The PCRF 330 generates, to the P-GW 320, a bearer establishment command corresponding to the QCI information in response to the bearer establishment command.

The P-GW 320 receives the bearer establishment command and establishes the bearer. The P-GW 330 is capable of establishing a bearer corresponding to the QCI information regarding traffic, based on the transmitted bearer establishment command corresponding to the QCI information. In addition, the P-GW 320 is also capable of modifying a default bearer or a dedicated bearer, which has been established, to meet the received QCI information. The P-GW 330 establishes a bearer and then transmits a response message for the bearer establishment to the PCRF 330.

The PCRF 330 is capable of transmitting, to the service accelerator 340, establishment state information including the QCI information regarding the bearer, based on the bearer establishment response message received from the P-GW 320. The service accelerator 340 is capable of maintaining information regarding establishment states of bearers by UE 300, cooperating with the PCRF 340. In this case, the service accelerator 340 is capable of generating a bearer establishment event to the PCRF only if the received traffic needs to be transmitted or a dedicated bearer corresponding to QCI of the traffic has not been established when requests of all of the UE are received. However, if the service accelerator 340 does not maintain information regarding states of dedicated bearers by UE 300, the service accelerator 340 generates a bearer establishment command to the P-GW when the received traffic needs to be transmitted or requests of all of the UE are received. Operations of each entity adapted to the method of establishing a bearer are described in detail with reference to FIGS. 5 and 6.

In another embodiment of the present invention, when UE is previously attached to an LTE core network (Evolved Packet Core (EPC)), the P-GW is capable of establishing the dedicated bearer 370 as well as the default bearer 360. In this case, the PCRF 330 is capable of establishing the dedicated bearer 370 when UE initially attaches to the network, and providing the service accelerator with information regarding the establishment state including QoS information regarding the dedicated bearer 370.

As described above, if the present invention ascertains that a dedicated bearer corresponding to QCI of traffic that the service accelerator 340 needs to transmit has been established or has existed, the present invention is capable of performing the mapping to a dedicated bearer corresponding to QCI of traffic that the P-GW receives after the ascertainment, and the transmission via the bearer.

Figure 5:
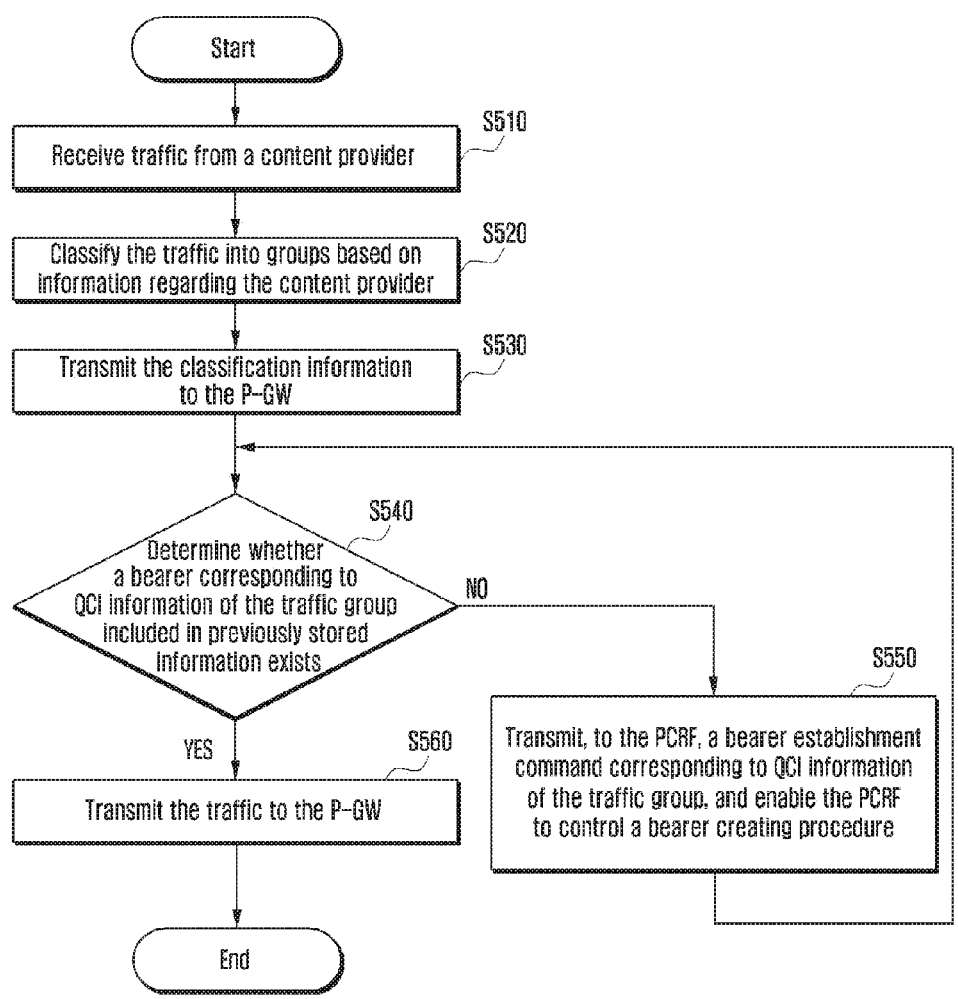
FIG. 5 is a flowchart that describes operations of a service accelerator for providing traffic differentiation service according to embodiments of the present invention.

FIG. 5 is a flowchart that describes operations of a service accelerator for providing traffic differentiation service according to embodiments of the present invention.

The service accelerator receives traffic from a content provider in operation S510. The content provider provides services via the traffic. The service accelerator is capable of classifying the traffic into groups based on information regarding the content provider in operation S520. The service accelerator may classify traffic by content providers, using various references, such as a domain name, an IP address of the traffic, etc. The service accelerator transmits the classification information to the P-GW in operation S530. The service accelerator creates only information classifying the traffic. The P-GW groups the classified traffic, which is described in detail below.

The service accelerator determines whether a bearer corresponding to QCI information of the traffic group indicating a previously stored QoS exists in operation S540. As described above, an operator can previously determine the configuration of QCI based on traffic characteristic-related information regarding traffic, and previously store the determined information in the service accelerator. That is, an operator can previously determine the configuration of QCI corresponding to information regarding a traffic type, a content provider, etc. included in traffic characteristic-related information. An example of the stored information regarding the configuration of QCI was described above as in the embodiment referring to FIG. 4. After that, the service accelerator is capable of determining whether a bearer corresponding to the received QCI of the traffic group is established between the P-GW and the eNB.

If a bearer corresponding to the received QCI information of the traffic group has not been established, the service accelerator transmits, to the PCRF, a bearer establishment command corresponding to QCI information of the traffic group, and enables the PCRF to control a bearer creating procedure in operation S550. After that, the P-GW is capable of establishing a bearer corresponding to the received QCI of the traffic group, according to the bearer establishment command of the PCRF.

On the other hand, if a bearer corresponding to the received QCI information of the traffic group has been established, the service accelerator is capable of transmitting the traffic to the P-GW in operation S560.

Figure 6:
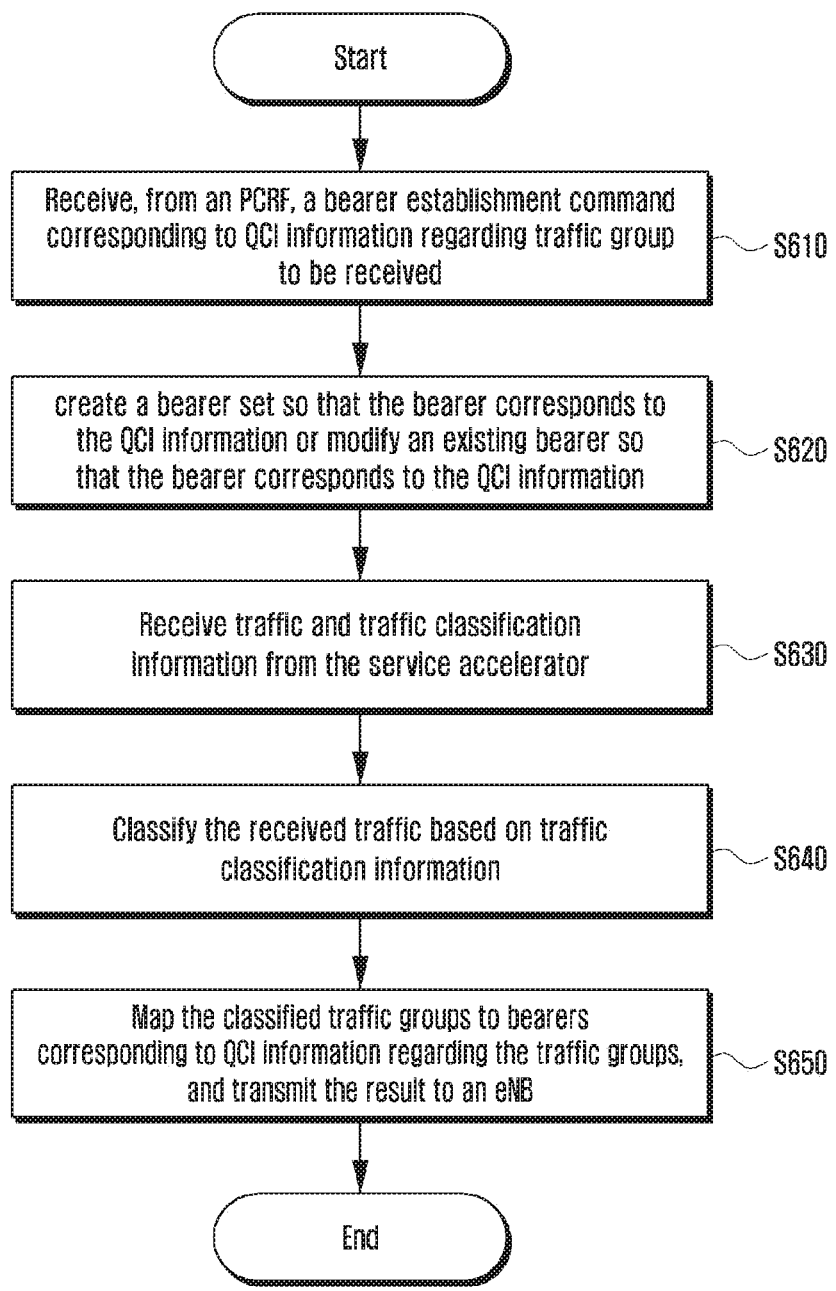
FIG. 6 is a flowchart that describes operations of a Packet Data Network Gateway (P-GW) for providing traffic differentiation service according to embodiments of the present invention.

FIG. 6 is a flowchart that describes operations of a Packet Data Network Gateway (P-GW) for providing traffic differentiation service according to embodiments of the present invention.

The P-GW is capable of receiving, from a PCRF, a bearer establishment command corresponding to QCI information regarding traffic group to be received in operation S610. The PCRF is capable of transmitting, to the P-GW, the bearer establishment command, in response to the bearer establishment command received from the service accelerator. The P-GW is capable of establishing a bearer set so that the bearer corresponds to the QCI according to the received bearer establishment command of traffic, or modifying an existing bearer so that the bearer corresponds to the QCI information in operation S620.

The P-GW is capable of receiving traffic and traffic classification information from the service accelerator in operation S630. The P-GW is capable of classifying the received traffic based on traffic classification information in operation S640. The classification information is referred to as information regarding traffic by content providers of the service accelerator, and is divided, based on using various references, such as a domain name, an IP address of the received traffic, etc.

The P-GW is capable of mapping traffic groups, classified according to content providers, to bearers corresponding to QCI information the traffic groups, and transmitting the result to an eNB in operation S650. As described above, since traffic corresponding to QCI information is mapped to and transmitted via a bearer, an operator can perform the differentiation and treatment of traffic, according to traffic characteristic-related attributes, according to an operator policy.

Figure 7:
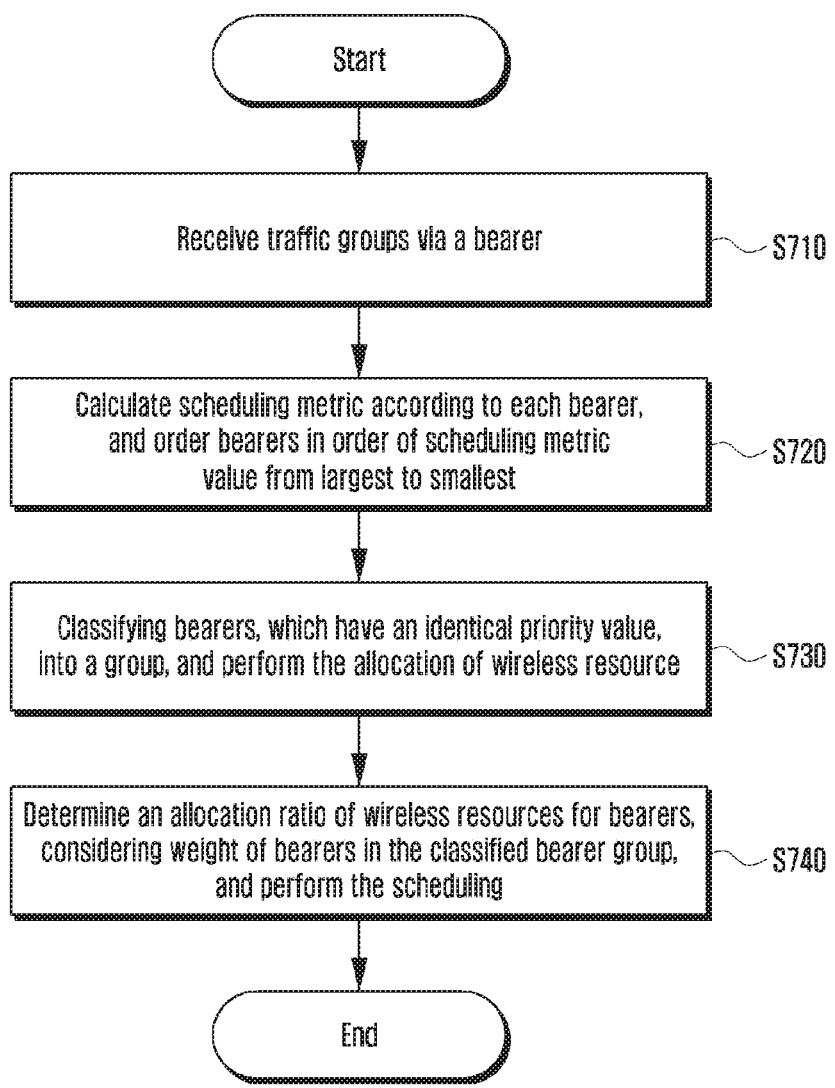
FIG. 7 is a flowchart that describes operations of an eNB for providing traffic differentiation service according to embodiments of the present invention.

FIG. 7 is a flowchart that describes operations of an eNB for providing traffic differentiation service according to embodiments of the present invention.

The eNB is capable of receiving traffic groups via a bearer in operation S710. The eNB receives traffic from a P-GW and classifies the traffic groups based on traffic classification information received from a service accelerator. The eNB is capable of ordering bearers based on a scheduling metric value calculated according to each bearer in operation S720. The eNB is also capable of ordering bearers in order of scheduling metric value from largest to smallest.

As an example of the scheduling metric, a proportional fairness scheduler is described as follows. When the eNB assigns the priority for resource allocation to UE as an allocation target candidate, the proportional fairness scheduler assigns the resource allocation priority to candidate bearers in order of scheduling metric value from largest to smallest, using the following equation 1.

$$\text{PF\_Metric}[k] = R(k,n)/T_{avg}(k,n) \qquad \text{[Equation 1]}$$

In equation 1, k denotes an index of a candidate bearer; n denotes time; and R denotes the quality of channel through which a current bearer k, assigned an allocation target resource, can perform the transmission of data at a data rate. $T_{avg}$ denotes a an average data rate assigned to a bearer k, i.e., an amount of resource allocated to the bearer for time n. As described in equation 1, the scheduling metric (PF-Metric) value increases in proportion as the channel quality of UE rises and the data rate allocated in average lowers. The greater the scheduling metric value of a bearer, the higher the resource allocation priority of the bearer. The proportional fairness scheduling method is capable of guaranteeing the fairness of resource allocation between UEs based on the scheduling processes described above and simultaneously enhancing an average throughput of system.

The eNB is capable of classifying bearers, which have an identical priority value as one of the QoS characteristics defined in a bearer level, into a group, and performing the allocation of wireless Resource Block (RB) in operation S730. That is, the eNB is capable of classifying bearers which have an identical priority value among the ordered bearers into one group, and performing the allocations of wireless resource block based on priority values by groups. The eNB is capable of determining whether the priority values are identical to each other, based on stored QCI information. If it is assumed that the table shown in FIG. 4 is information stored in the eNB and the two bearers transmitting traffic have QCI '6' and '128' respectively, the eNB is capable of determining that traffic received via the bearer has an identical priority and grouping the traffic into the same group. The eNB performs the allocation of RBs, considering the number of wireless resources available according to groups and the buffer states by bearers of a bearer group and ordered bearers (i.e., an amount of data in a transmitting standby state), and calculates MAC PDU (Protocol Data Unit).

The eNB is capable of determining an allocation ratio of wireless resources for bearers, considering weight of bearers in a bearer group where the priority values are identical to each other, and scheduling the allocation in operation S740. In particular, the present invention performs the allocation of weights based on information regarding content providers of traffic. If there is traffic that needs to be preferentially differentiated according to operator policies, the present invention is capable of allocating a relatively large weight to the traffic. That is, traffic that belongs to a premium group may be allocated a weight higher than that allocated to traffic that belongs to a default group.

In order for an operator to allow the eNB to distinguish weight information allocated to traffic groups, the operator is capable of allocating, if weight information differs from each other, different QCI to the groups. The information regarding the configuration of QCI described above may be previously stored in the eNB. In particular, if there is traffic that needs to be preferentially differentiated according to operator policy and thus is classified into a premium group, the traffic may be allocated a weight larger than that allocated to traffic which does not need to be preferentially differentiated and is classified into a default group. QCI of a premium group to which a relatively large weight is assigned may be set with Operator-specific QCI information, so that the QCI can be distinguished from the other.

The operator-specific QCI information is set by an operator. The operator-specific QCI information is QCI that has a range of integer values 128~131, instead of a range of integer values 0~9. That is, if the eNB ascertains that the received QCI information regarding traffic is QCI having a range of 128~131, it recognized that the information is traffic of a premium group that the operator needs to preferentially treats process and also the weight of the traffic based on the information regarding the configuration of QCI which is previously stored.

The eNB is capable of distributing MAC PDU and wireless resources allocated to the bearer, based on a ratio of weights of traffic classified into one group. That is, it is assumed that one group includes two bearers which are allocated weights W1 and W2, respectively. A bearer of weight W1 is allocated a wireless resource with a ratio of W1/(W1+W2). A bearer of weight W2 is allocated a wireless resource with a ratio of W2/(W1+W2). Therefore, although traffic is of an identical traffic type, the method described above is capable of providing differentiated QoS, at a corresponding ratio, according to content providers, considering weights of traffic.

In addition, the method is advantageous because it can differentiate and treat traffic of a premium group and traffic of a default group only if congestion occurs in an access network which is caused by the allocation of wireless resource. That is, if an access network is not in a congestion state, the eNB needs to be capable of transmitting traffic of all of the bearers in a group, without considering weights. However, if traffic, which has an identical traffic type, is assigned different priority, although a network is not in a congestion state, a bearer transmitting traffic of a premium group is always unnecessarily allocated a relatively large amount of available wireless resources, and this decreases the utilization of the network. In addition, a bearer transmitting traffic of a premium group contends with a bearer transmitting traffic having a QCI corresponding to a QoS characteristic of a higher class about an available wireless resource, which causes to reduce QoS of traffic whose traffic type has a relatively high degree of importance, which is disadvantageous.

Figure 8:
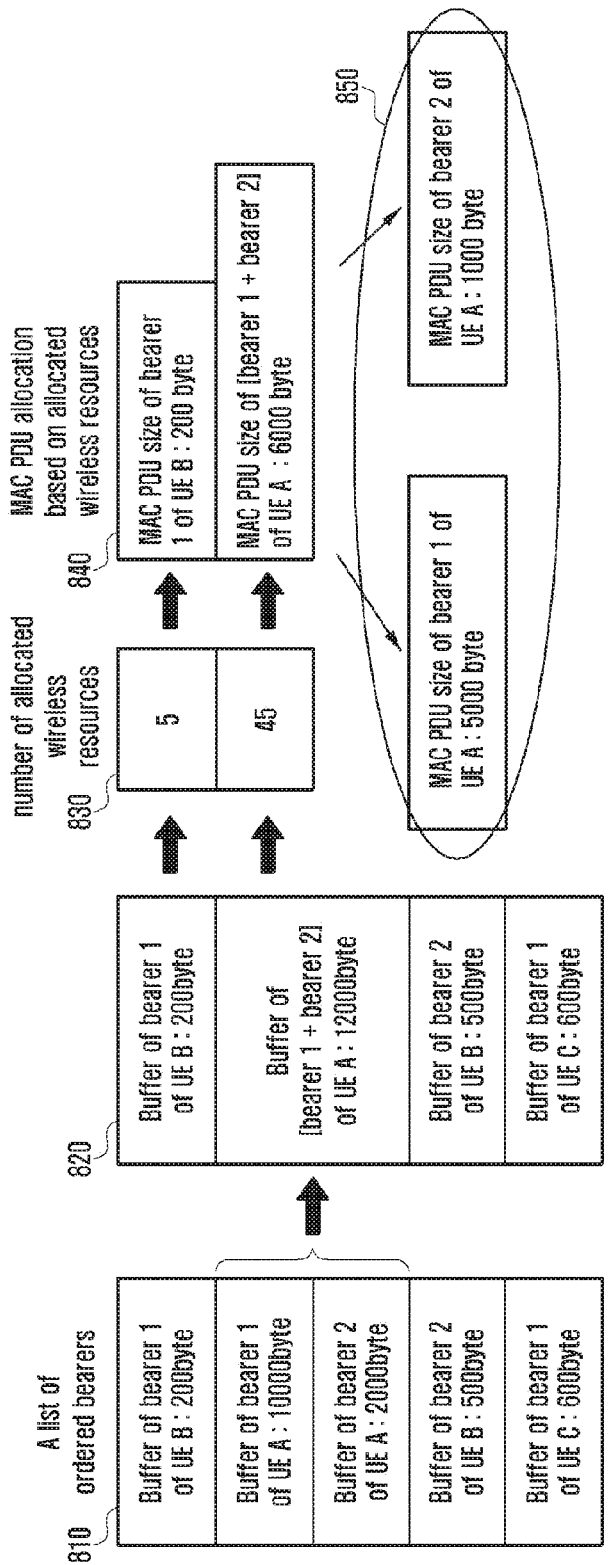
FIG. 8 is a diagram that describes an operation method of an eNB scheduler according to embodiments of the present invention.

FIG. 8 is a diagram that describes an operation method of an eNB scheduler according to embodiments of the present invention.

More specifically, the embodiment shown in FIG. 8 is described, based on the scheduling method of the eNB described as in the embodiment shown in the FIG. 7. The scheduler of the eNB calculates scheduling metric values according to bearers, and orders bearers in order of value from the largest to the smallest (810). The following embodiment is described, assuming that traffic, transmitted from bearer 1 of UE A and bearer 2 of UE B, is of an identical traffic type, and traffic, transmitted from different content providers, corresponding to bearer 1 and bearer 2, differs from each other in terms of the weight information among the QoS characteristics.

With respect to a number of bearers ordered according to the assumption, bearer 1 and bearer 2 of UE A are classified into one group with the same priority (820). The eNB performs the allocation of RBs, considering the number of wireless resources available according to groups and the buffer states by bearers of a bearer group or ordered bearers (i.e., an amount of data in a transmitting standby state), so that bearer 1 of UE B and bearer 1, 2 of UE A are allocated 5 and 45 wireless resources, respectively (830). When MAC PDU is calculated based on the allocated wireless resources, 6000 bytes is distributed to the group of bearer 1, 2 of UE A (840).

In the following description, based on weight information regarding traffic transmitted by the bearer 1 and bearer 2 in a group into which bearer 1 and bearer 2 of UE A are grouped, wireless resources allocated to the group are re-ordered (850). It is assumed that: traffic transmitted via bearer 1 of UE A belongs to a premium group; traffic transmitted via bearer 2 of UE A belongs to a default group; weights of traffic of bearers are denoted by W1 and W2; and W1:W2=5:1 weight information is determined according to operator policies.

In this case, as shown in FIG. 8, the scheduling is performed in such a way that: among the MAC PDU calculated, based on the total number of wireless resources allocated to bearer 1 and bearer 2 of UE A, W1/(W1+W2) =5/6 is allocated to bearer 1 transmitting the traffic of a premium group and ⅙ is allocated to bearer 2 transmitting the traffic of a default group. Therefore, 5000 bytes are allocated to bearer 1 and 1000 bytes are allocated to bearer 2.

In order to differentiate and treat traffic according to content providers, characteristics of weight are additionally applied to QoS characteristics of traffic, so that, wireless resources can be allocated to traffic of a premium group and traffic of a default group, which are of an identical type, with a ratio of 5:1 according to initial operator policy, based on the weights. If the embodiment described above does not additionally consider characteristics of weight, when wireless resources distributed to bearers 1 and 2 of UE A are allocated to bearers 1 and 2, wireless resources and MAC PDUs are arbitrarily distributed. The differentiation of traffic of a premium group and traffic of a default group is not easily performed, differently from the intention of an operator.

Figure 9:
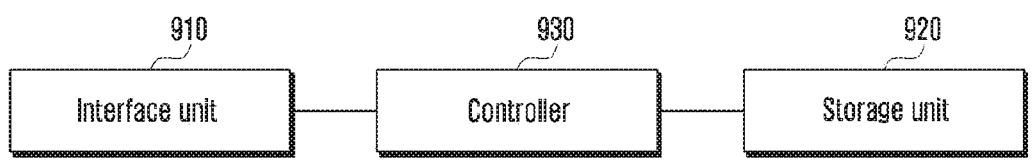
FIG. 9 is a block diagram showing the internal configuration of a service accelerator according to embodiments of the present invention.

FIG. 9 is a block diagram showing the internal configuration of a service accelerator according to embodiments of the present invention.

As shown in FIG. 9, the service accelerator 140 is capable of including an interface unit 910, a storage unit 920, and a controller 930.

The interface unit 910 is connected to a P-GW 120, a PCRF 130, a content provider 150 of an external Internet, and is capable of performing the transmission/reception of traffic and information to provide differentiated QoS characteristics of traffic. More specifically, the interface unit 910 is capable of receiving traffic from the content provider 150 of the external Internet.

The interface unit 910 is capable of transmitting, to the PCRF 130, a bearer establishment command for transmitting the received traffic, as the need arises. The interface unit 910 is capable of receiving a signal for determining whether the controller 930 of the service accelerator needs to establish the bearer, and transmitting, to the PCRF 130, a bearer establishment command corresponding to QCI information of traffic to be transmitted. The interface unit 910 is capable of receiving, from the PCRF 130, establishment state information including QCI information regarding a bearer which is currently generated. The interface unit 910 is capable of continuously receiving bearer establishment state information from the PCRF 130, and maintaining establishment state information regarding bearers by UEs.

The interface unit 910 is capable of transmitting, to the P-GW 120, classification information regarding traffic which is received by the controller 930 from the current interface unit 910 and which is classified into groups based on content provider information regarding traffic. When the controller 930 ascertains that a bearer corresponding to QCI information regarding the received traffic exists, the interface unit 910 is capable of transmitting the received traffic to the P-GW.

The storage unit 920 is capable of temporarily storing traffic that the interface unit 910 received from a content provider of the external Internet. The storage unit 920 is capable of previously storing information regarding the configuration of QCI that an operator has previously set based on a traffic type and a content provider among the traffic characteristic-related information. The configuration of QCI is shown in FIG. 4. The storage unit 920 is capable of previously storing content provider information regarding traffic to provide a differentiation service that belongs to a premium group, determined according to an operator policy.

The controller 930 is capable of controlling the reception of traffic from at least one or more content providers. The controller 930 is capable of controlling the classification of the received traffic into at least one or more groups based on content provider information included in previously stored traffic characteristic-related information, and the transmission of the classification information to the P-GW. The controller 930 is capable of determining whether a bearer corresponding to QCI information regarding the classified traffic groups exists.

If a bearer corresponding to QCI information regarding at least one or more traffic groups does not exist, the controller 930 is capable of controlling the transmission of a bearer establishment signal corresponding to QCI information regarding the traffic group to the PCRF. If a bearer corresponding to QCI information regarding at least one or more traffic groups exists, the controller 930 is capable of controlling the transmission of the traffic to the P-GW.

Figure 10:
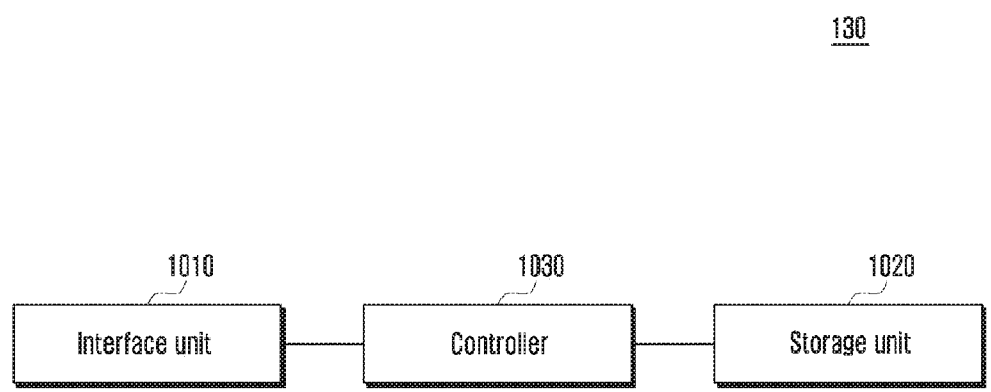
FIG. 10 is a block diagram showing the internal configuration of a Policy and Charging Rules Function (PCRF) according to embodiments of the present invention.

FIG. 10 is a block diagram showing the internal configuration of a Policy and Charging Rules Function (PCRF) according to embodiments of the present invention.

As shown in FIG. 10, the Policy and Charging Rules Function (PCRF) 130 is capable of including an interface unit 1010, a storage unit 1020, and a controller 1030.

The interface unit 1010 is connected to the P-GW 120 and the service accelerator 140 and is capable of performing the transmission/reception of traffic and information to provide differentiated QoS of traffic. The interface unit 1010 is capable of receiving, from the service accelerator 140, a bearer establishment command for transmitting traffic, received by the service accelerator 140, from the P-GW 120 to an eNB. The interface unit 1010 is capable of receiving, from the service accelerator 140, a bearer establishment command corresponding to QCI information indicating QoS characteristic of traffic to be transmitted. The interface unit 1010 is capable of transmitting, to the service accelerator 140, establishment state information including QCI information regarding a bearer which is currently generated. The interface unit 1010 is capable of continuously transmitting bearer establishment state information to the service accelerator 140, and maintaining establishment state information regarding bearers by UEs.

When the interface unit 1010 receives a bearer establishment command from the service accelerator 140e, it is capable of transmitting the bearer establishment command to the P-GW 120. The interface unit 1010 is capable of receiving, from the P-GW 120, bearer establishment state information including QCI information regarding a bearer which is currently established.

The storage unit 1020, located between the service accelerator 140 and the P-GW 120, performs the transmission and reception of bearer establishment commands and bearer establishment state information and temporarily stores the bearer establishment commands and bearer establishment state information. The storage unit 1020 is capable of previously storing information regarding the configuration of QCI that has been preset based on a traffic type and a content provider among the traffic characteristic-related information. The configuration of QCI is shown in FIG. 4. The storage unit 1020 is capable of previously storing content provider information regarding traffic to provide a differentiation service that belongs to a premium group, determined according to an operator policy.

The controller 1030 is capable of controlling the reception, from the service accelerator, of a bearer establishment signal corresponding to QCI information regarding a traffic group which will be transmitted to the P-GW. The controller 1030 is capable of controlling the transmission, to the P-GW, of a bearer establishment command corresponding to the QCI information regarding a traffic group, in response to the bearer establishment signal.

Figure 11:
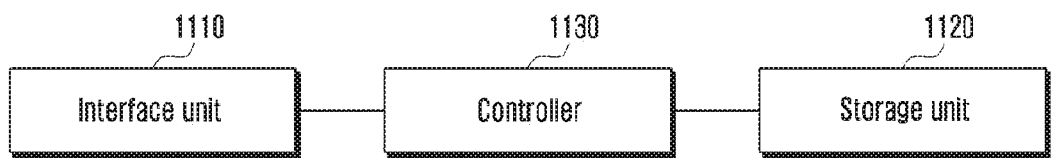
FIG. 11 is a block diagram showing the internal configuration of a Packet Data Network Gateway (P-GW) according to embodiments of the present invention.

FIG. 11 is a block diagram showing the internal configuration of a Packet Data Network Gateway (P-GW) according to embodiments of the present invention.

As shown in FIG. 11, the P-GW 120 is capable of including an interface unit 1110, a storage unit 1120, and a controller 1130.

The interface unit 1110 is connected to the eNB 110, the PCRF 130, and the service accelerator 140, and is capable of performing the transmission/reception of traffic and information to provide differentiated QoS of traffic. The interface unit 1110 is capable of receiving, from the service accelerator 140, traffic to be received and classification information regarding traffic. The interface unit 1110 is capable of receiving, from the PCRF 130, a bearer establishment command corresponding to QCI information regarding the traffic to be received. The interface unit 1120 is capable of transmitting traffic to the eNB 110 via a bearer corresponding to QoS of the received traffic.

The storage unit 1120 is capable of previously storing information regarding the configuration of QCI that has been preset based on a traffic type and a content provider among the traffic characteristic-related information.

The controller 1130 is capable of controlling the reception, from the PCRF, of a bearer establishment command including QCI information regarding a traffic group to be received from the service accelerator. The controller 1130 is capable of controlling the creation of a bearer corresponding to the QoS-related information or the modification of an existing bearer to correspond to the received QCI information in response to the bearer establishment command.

The controller 1130 is capable of controlling the reception of traffic and classification information regarding traffic from the service accelerator. The controller 1130 is capable of classifying the received traffic into group, based on the traffic classification information. The controller 1130 is capable of controlling the reception of QCI information regarding the traffic groups from the PCRF. The controller 1130 is capable of controlling the traffic group to the eNB via a bearer corresponding to the QCI information regarding a traffic group.

Figure 12:
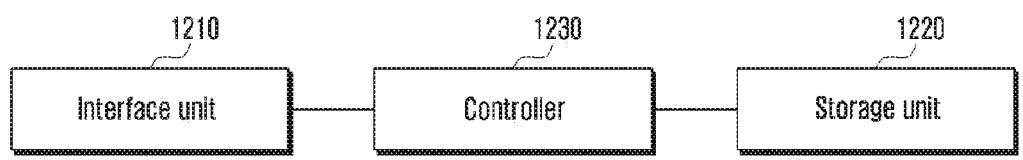
FIG. 12 is a block diagram showing the internal configuration of an eNB according to embodiments of the present invention.

FIG. 12 is a block diagram showing the internal configuration of an eNB according to embodiments of the present invention.

As shown in FIG. 12, the eNB 110 is capable of including an interface unit 1210, a storage unit 1220, and a controller 1230.

The interface unit 1210 is connected to the P-GW 120 and is capable of performing the transmission/reception of information to provide differentiated QoS of traffic. The interface unit 1210 is capable of receiving the traffic from the P-GW 120 via the bearer. The interface unit 1210 is capable of transmitting the received traffic to UE 100, based on the allocation of a wireless resource for the bearer transmitting the traffic by the controller 1230 of the eNB.

The storage unit 1220 performs the reception from the P-GW 120, allocates resources to a bearer of traffic, and temporarily stores traffic to be transmitted to UE 100. The storage unit 1220 is capable of storing algorithms for calculating scheduling metric and currently available wireless resource information as information which is required to allocate resources to the bearer.

The controller 1230 is capable of controlling the reception of traffic groups transmitted from the P-GW via at least one or more bearers. The controller 1230 is capable of controlling the allocation of wireless resources, based on weight information corresponding to at least one or more bearers.

The terms as used in various embodiments of the present invention are merely for the purpose of describing particular embodiments and are not intended to limit the present disclosure. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

The invention claimed is:

1. A traffic transmission method of a service accelerator in a mobile communication system comprising:
    receiving traffic from at least one content provider;

classifying the received traffic into at least one traffic group based on content provider information associated with the at least one content provider that transmitted the traffic;
determining whether a bearer corresponding to Quality of Service Class Identifier (QCI) information of the classified at least one traffic group exists; and
transmitting, if the bearer corresponding to the QCI information of the classified at least one traffic group does not exist, a signal for establishing the bearer corresponding to QCI information of the at least one classified traffic group to a Policy and Charging Rules Function (PCRF).

2. The method of claim 1, further comprising:
transmitting the traffic to a Packet Data Network Gateway (P-GW) if the bearer corresponding to the QCI information of at least one traffic group exists.

3. The method of claim 1, wherein:
the QCI information of the at least one traffic group corresponds to a Quality of Service (QoS) characteristic of the at least one traffic group, and is previously determined based on the content provider information on the at least one traffic group; and
the QCI information of the at least one traffic group is operator specific QCI information if the content provider of the at least one traffic group is a specific content provider previously determined by an operator.

4. The method of claim 3, wherein:
the QoS characteristic comprises priority and/or weight information;
the priority information is previously determined, based on traffic type information included in the traffic characteristic-related information; and
the weight information is previously determined based on the information on the content provider.

5. A traffic transmission supporting method of a Policy and Charging Rules Function (PCRF) in a mobile communication system comprising:
receiving, from a service accelerator, a bearer establishment signal corresponding to Quality of Service Class Identifier (QCI) information a traffic group to be transmitted to a Packet Data Network Gateway (P-GW); and
transmitting, to the P-GW, a bearer establishment command corresponding to QCI information on the traffic group, in response to the bearer establishment signal,
wherein the QCI information corresponds to a Quality of Service (QoS) characteristic of the traffic group and is determined based on information on a content provider of the traffic group which is classified based on content provider information associated with the at least one content provider that transmitted the traffic.

6. The method of claim 5, wherein the QCI information on the traffic group is operator specific QCI information if the content provider of the traffic group is a specific content provider previously determined by an operator.

7. A traffic transmission method of a Packet Data Network Gateway (P-GW) in a mobile communication system comprising:
receiving, from a Policy and Charging Rules Function (PCRF), a bearer establishment command corresponding to Quality of Service Class Identifier (QCI) information of a traffic group to be received from a service accelerator; and
establishing a bearer corresponding to the QCI information or modifying an existing bearer to correspond to the received QCI information, in response to the bearer establishment command,
wherein the QCI information corresponds to a Quality of Service (QoS) characteristic of the traffic group and is determined based on information on a content provider of the traffic group which is classified based on content provider information associated with the at least one content provider that transmitted the traffic.

8. The method of claim 7, further comprising:
receiving, from a service accelerator, traffic and classification information on the traffic;
classifying the received traffic into groups, based on the traffic classification information;
receiving, from the PCRF, QCI information on the traffic group; and
mapping the traffic group to a bearer corresponding to the QCI information on the traffic group, and transmitting the result to a base station.

9. A traffic transmission method of a base station in a mobile communication system comprising:
receiving, from a Packet Data Network Gateway (P-GW), a traffic group transmitted via at least one bearer corresponding to Quality of Service Class Identifier (QCI) information; and
allocating wireless resources, based on information on weights included in Quality of Service (QoS) characteristics corresponding to the at least one bearer,
wherein the QCI information corresponds to a QoS characteristic of the traffic group and is determined based on information on a content provider of the traffic group which is classified based on content provider information associated with the at least one content provider that transmitted the traffic.

10. The method of claim 9, wherein allocating wireless resources comprises:
ordering at least one or more bearers based on schedule metric information on each bearer;
classifying at least one or more bearers, which have the same priority information, included in the QoS characteristics, corresponding to the bearer, into groups;
allocating wireless resources, in a unit of classified bearer group, considering the number of available wireless resource blocks (RBs) and states of buffers by bearers; and
allocating the wireless resources allocated in a group unit to at least one or more bearers in the group, based on information on weights of a bearers in the group,
wherein the information on weights is greater than information on a weight of a bearer having non-operator characteristic QCI if QCI corresponding to a bearer establishment command of the bearer is operator specific QCI.

11. A service accelerator for performing the transmission of traffic in a mobile communication system comprising:
an interface;
a controller configured to control the interface to receive traffic from at least one content provider, classify the received traffic into at least one traffic group based on content provider information associated with the at least one content provider that transmitted the traffic, determine whether a bearer corresponding to Quality of Service Class Identifier (QCI) information of the classified at least one traffic group exists, and control the interface to transmit, if the bearer corresponding to the QCI information of the classified at least one traffic group does not exist, a signal for establishing the bearer corresponding to QCI information of the classified at least one traffic group to a Policy and Charging Rules Function (PCRF).

12. The service accelerator of claim 11, wherein the controller is further configured to control the interface to transmit the traffic to a Packet Data Network Gateway (P-GW) if the bearer corresponding to the QCI information of at least one traffic group exists.

13. The service accelerator of claim 11, wherein:
the QCI information of the at least one traffic group corresponds to a Quality of Service (QoS) characteristic of the at least one traffic group, and is previously determined based on the content provider information on the at least one traffic group; and
the QCI information of the at least one traffic group is operator specific QCI information if the content provider of the at least one traffic group is a specific content provider previously determined by an operator.

14. The service accelerator of claim 13, wherein:
the QoS characteristic comprises priority and/or weight information;
the priority information is previously determined, based on traffic type information included in the traffic characteristic-related information; and
the weight information is previously determined based on the information on the content provider.

15. A Policy and Charging Rules Function (PCRF) for supporting the transmission of traffic in a mobile communication system comprising:
an interface: and
a controller configured to control the interface to receive, from a service accelerator, a bearer establishment signal corresponding to Quality of Service Class Identifier (QCI) information on a traffic group to be transmitted to a Packet Data Network Gateway (P-GW), and transmit, to the P-GW, a bearer establishment command corresponding to QCI information on the traffic group, in response to the bearer establishment signal,
wherein the QCI information corresponds to a Quality of Service (QoS) characteristic of the traffic group and is determined based on information on a content provider of the traffic group which is classified based on content provider information associated with the at least one content provider that transmitted the traffic.

16. The PCRF of claim 15 wherein the QCI information on the traffic group is operator specific QCI information if the content provider of the traffic group is a specific content provider determined by an operator.

17. A Packet Data Network Gateway (P-GW) for performing the transmission of traffic in a mobile communication system comprising:
an interface; and
a controller configured to control the interface to receive, from a Policy and Charging Rules Function (PCRF), a bearer establishment command corresponding to Quality of Service Class Identifier (QCI) information of a traffic group to be received from a service accelerator; and establish a bearer corresponding to the QCI information or modifying an existing bearer to correspond to the received QCI information, in response to the bearer establishment command,
wherein the QCI information corresponds to a Quality of Service (QoS) characteristic of the traffic group and is determined based on information on a content provider of the traffic group which is classified based on content provider information associated with at least one content provider that transmitted the traffic.

18. The P-GW of claim 17, wherein the controller is further configured to control the interface to receive, from a service accelerator, traffic and classification information on the traffic; classify the received traffic into groups, based on the traffic classification information, receive from the PCRF, QCI information on the traffic group, map the traffic group to a bearer corresponding to the QCI information on the traffic group, and transmit the result to a base station.

19. A base station for performing the transmission of traffic in a mobile communication system comprising:
an interface; and
a controller configured to control the interface to receive, from a Packet Data Network Gateway (P-GW), a traffic group transmitted via at least one bearer corresponding to Quality of Service Class Identifier (CQI) information; and allocate wireless resources, based on information on weights included in Quality of Service (QoS) characteristics corresponding to the at least one bearer,
wherein the QCI information corresponds to a QoS characteristic of the traffic group and is determined based on information on a content provider of the traffic group which is classified based on content provider information associated with the at least one content provider that transmitted the traffic.

20. The base station of claim 19, wherein the controller is further configured to:
order at least one or more bearers based on schedule metric information on each bearer; classify at least one or more bearers, which have the same priority information, included in QoS characteristics, corresponding to the bearer, into groups; allocate wireless resources, in a unit of classified bearer group, considering the number of available wireless resource blocks (RBs) and states of buffers by bearers, and allocate the wireless resources allocated in a group unit to at least one or more bearers in the group, based on information weights of a bearer in the group,
wherein the information on weights is greater than information on weight of a bearer having non-operator characteristic QCI if QCI corresponding to a bearer establishment command of the bearer is operator specific QCI.

\* \* \* \* \*